Jan. 17, 1961   W. H. DU SHANE ET AL   2,968,188
MULTI-SPEED DRIVE FOR POWER TAKE-OFFS AND THE LIKE
Filed Sept. 22, 1958   2 Sheets-Sheet 1

INVENTOR.
W. H. DuSHANE
R. L. JACKLIN

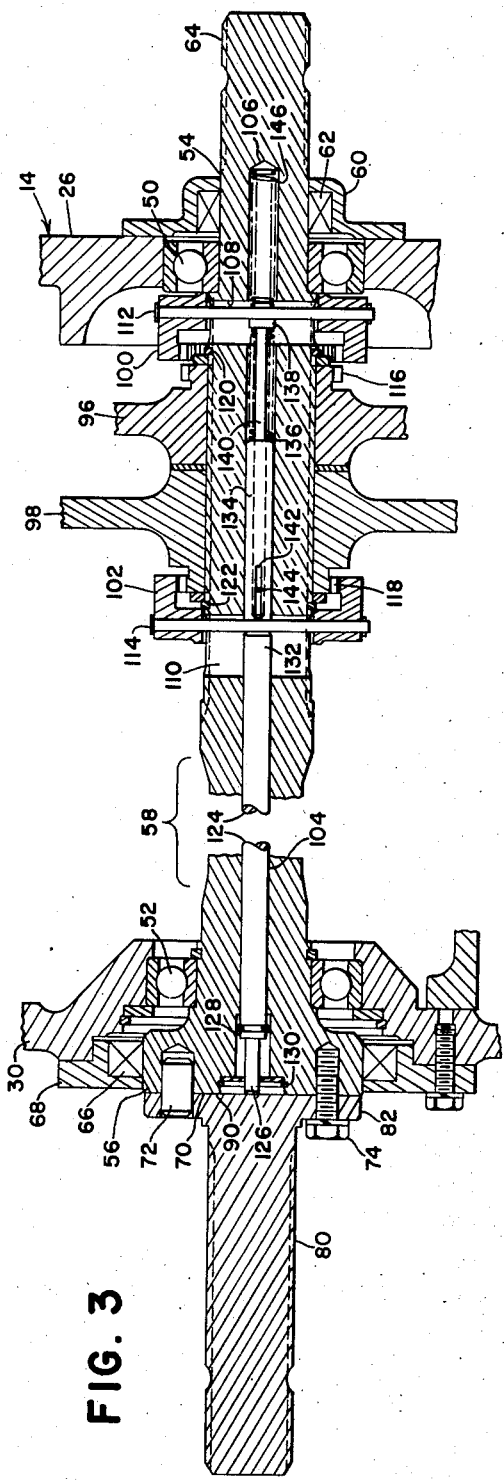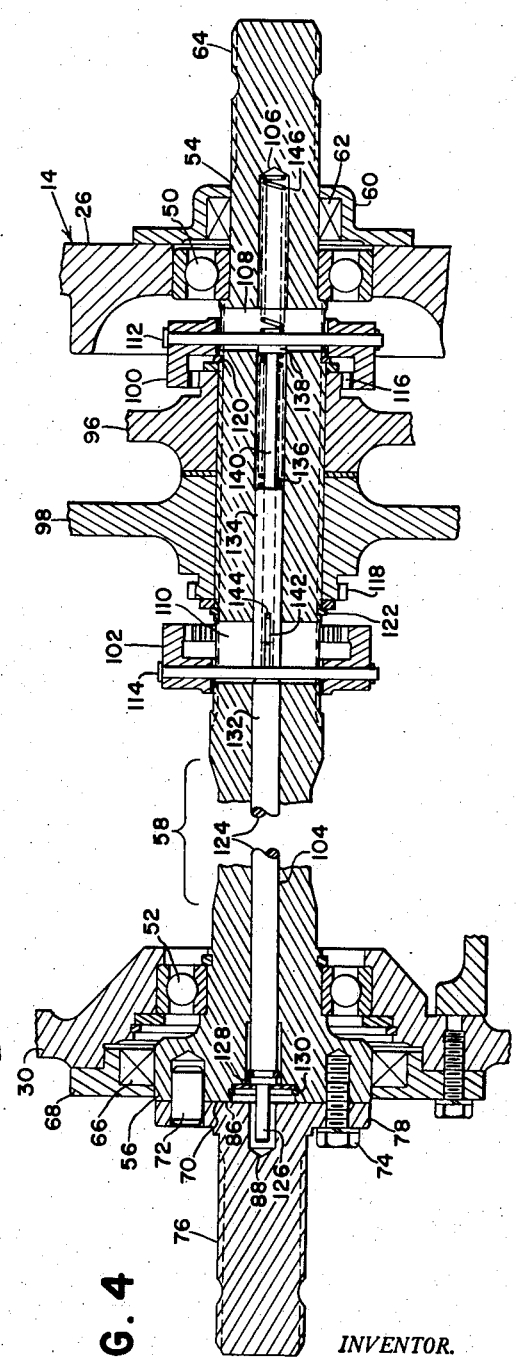

United States Patent Office 2,968,188
Patented Jan. 17, 1961

2,968,188
MULTI-SPEED DRIVE FOR POWER TAKE-OFFS AND THE LIKE

Wallace H. Du Shane and Roger L. Jacklin, Waterloo, Iowa, assignors to Deere & Company, Moline, Ill., a corporation of Delaware Filed Sept. 22, 1958, Ser. No. 762,588

12 Claims. (Cl. 74—375)

This invention relates to power transmission means and more particularly to multi-speed means for power take-off and like mechanisms.

As applied to power take-off mechanisms used on agricultural tractors, the invention has significant utility in equipping the tractor with both high- and low-speed power take-offs for driving associated implements. In this respect, cognizance should be taken of the fact that industry-wide standards have been previously set up governing power take-off shafts, the speeds, and sizes thereof, the relationships thereof to drawbars, hitchpoints, etc. The first standards pertaining to the power take-off drive for farm tractors were introduced in 1923 and, among other things, established a speed of rotation of 540 r.p.m. Standardization of sizes, splines, locations relative to drawbars etc. enabled the concomitant establishment of specifications which permitted any standardized power take-off drive implement to be driven by any tractor equipped with a standardized power take-off shaft.

The standards set forth above have existed for thirty-five years but now new standards have been introduced, involving primarily the increase of power take-off speed to 1,000 r.p.m. and the use of a twenty-one-tooth involute-shaped spline in place of the old six-straight-sided spline, plus variations in the location of the shaft relative to hitchpoints, etc.

Although the new standards introduce many and significant advantages, they are not without certain disadvantages, primarily important among which is the requirement that either old implements be adapted to the new standards, especially as to speed, or the new tractors be equipped with conversion mechanism for reducing the 1,000 r.p.m. speed to the 540 r.p.m. speed for use with old implements. Likewise, the change in the spline for the new standardized shaft means that this spline will not fit couplings built according to the old standards.

According to the present invention, the disadvantages are eliminated and the benefits are retained by the use of a multi-speed power take-off mechanism which incorporates adaptor shaft extensions enabling the use of the high-speed power take-off shaft with modern high-speed implements and the use of a slow-speed power take-off shaft with implements originally designed to operate with the slow-speed shaft. Of greater significance is the feature of the invention that automatically conditions the power take-off drive means to operate at the speed for which the particular adaptor shaft is designed. That is to say, when the 1,000 r.p.m. adaptor shaft is used, the power take-off drive is automatically conditioned to drive the shaft at 1,000 r.p.m.; when the 540 r.p.m. adaptor shaft is used, the power take-off drive is automatically conditioned to drive at 540 r.p.m. This arrangement prevents the inadvertent use of the 1,000 r.p.m. drive with implements designed to operate with a 540 r.p.m. power take-off shaft, it being recognized that the higher speed would be destructive in the case of most older implements.

Specifically, it is an object of the invention to provide a drive transmission design which may be incorporated in the tractor transmission or a take-off therefrom as original equipment, thus making available the two-speed power take-off drive without the addition of expensive conversion units. It is an important feature of the invention to provide a power shaft having an axial bore which incorporates actuating means for effecting the speed changes, the actuating means having a portion exposed at the rear terminal end of the shaft and conditioned by the particular type of power take-off shaft extension to select the proper power take-off speed in the driving transmission. A further object of the invention resides in an actuating means which will insure disconnection of the drive in one speed prior to connection of the drive in the other speed, which not only prevents locking up of the transmission but also assures easy speed changes without the application of undue force or other complicated procedures.

The foregoing and other important objects and desirable features inherent in and encompassed by the invention will become apparent to those versed in the art as a preferred embodiment of the invention is disclosed, by way of example, in the following detailed description and accompanying sheets of drawings, the several figures of which are described below.

Fig. 3 is a still further enlarged section showing the power shaft with the low-speed adaptor in place and the dual-speed drive shifted to produce the low speed for the power take-off.

Fig. 4 is a similar section showing the 1,000 r.p.m. adaptor in place and illustrating the automatic shift to high speed drive for the power take-off.

Figure 2:
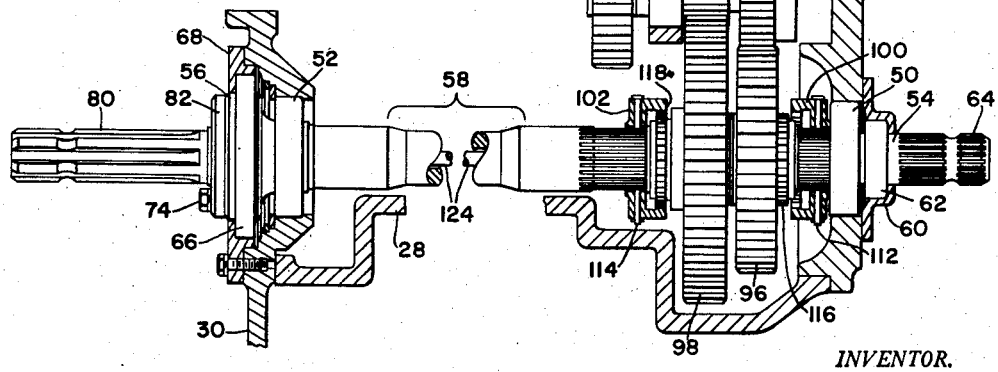
Fig. 2 is an enlarged section through the tractor transmission and the drive means for the power take-off.

The tractor chosen for purposes of illustration may be considered as generally typical of an ordinary farm tractor, with certain modifications not important here. To the extent presently significant, the tractor is shown as having a longitudinal body 10 carried on right and left hand rear traction wheels, only the left hand one of which is shown at 12. The rear portion of the body 10 includes a transmission case 14 from which axles extend oppositely to the traction wheels. The right hand axle is designated by the numeral 16. An operator's seat 18 is located in a rearward position convenient to a steering wheel 20 behind a forwardly extending engine hood structure 22. The forward end of the tractor may be conventionally supported on any type front wheels (not shown here). The engine structure 22 encloses a power source such as an internal combustion engine, not illustrated but referred to as means for driving a rearwardly extending transmission shaft 24 (Fig. 2).

At this point, it should be noted that such expressions as "front," "rear," "right" and "left" are used in the interests of brevity and clarity and are therefore words of convenience and not of limitation, since the components may be arranged other than as illustrated. In other words, the present arrangement is typical and not exclusive.

The transmission casing 14 includes a transverse front wall 26, bottom wall means 28 and a transverse upright rear wall 30, in addition to a top wall 32 which forms an enclosure or housing for the tractor transmission and power take-off drive means, the details of which will be presently described.

In a typical situation, the engine or transmission shaft 24 is extended rearwardly for connection to the tractor transmission, not shown. This transmission may be of any suitable type and the specific characteristics thereof are of no present moment. Suffice it to note that the shaft 24 has keyed thereto a driving gear 34 which is in constant mesh with an idler gear 36 which is in mesh with a relatively large gear 38 that forms an integral gear cluster with a smaller coaxial gear 40. The transmission case has a suitable supporting portion 42 in which is mounted an anti-friction bearing 44 for supporting a shaft 46 on which the gear cluster 38–40 may be journaled. The numeral 48 represents a gear associated with the tractor transmission and its appearance is material only as a matter of environment. The gear cluster 38—40, as will presently appear, may be considered as driving means for the power shaft to be described.

Figure 1:
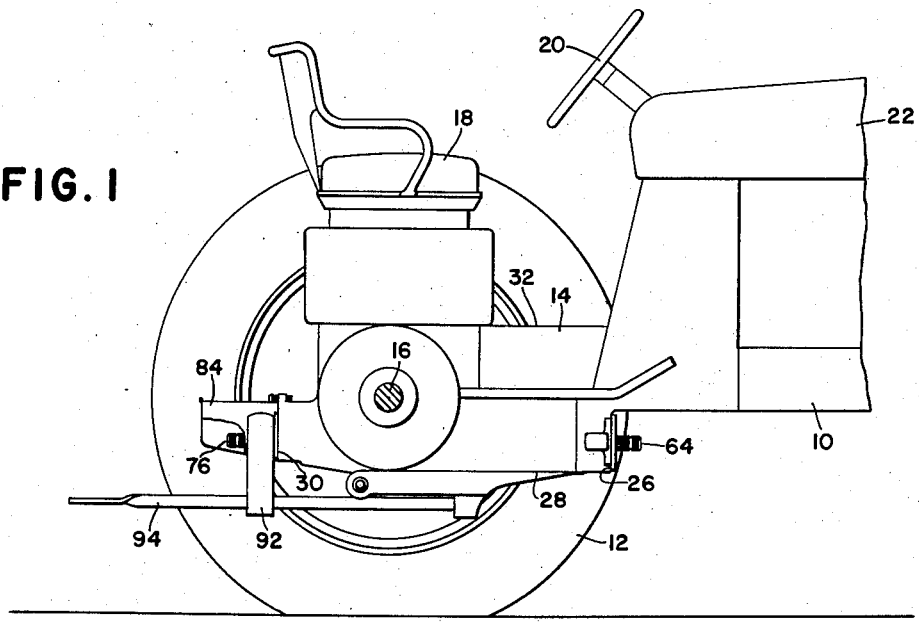
Fig. 1 is a side elevational view of a rear portion of a tractor, with the near rear wheel removed, illustrating the overall relationship of the front and rear power take-off shafts to the tractor as a whole.

The front and rear walls 26 and 30 of the transmission case 14 respectively carry front and rear anti-friction bearings 50 and 52 for journaling the axially distantly separated front and rear ends 54 and 56, respectively, of a fore-and-aft power shaft 58. A front cap 60 retains an appropriate lubricant seal 62 (shown schematically in Figs. 3 and 4), and the forward end 54 of the power shaft 58 is extended as a front power take-off shaft 64, here shown as being formed with the twenty-one tooth spline as discussed above in connection with the modern power take-off standards. The rear end 54 of the power shaft 58 is upset or otherwise enlarged and is surrounded by an appropriate lubricant seal 66 (shown schematically in Figs. 3 and 4) and retained by a rear cap 68. The rear end portion 54 of the shaft 58 further includes a flat rear radial face 70 which is bored to receive locating pins 72 and which is further bored and tapped to receive a plurality of cap screws, a representative one of which is shown at 74. The locating pins 72 and cap screws 74 are instrumental in mounting on the rear end 54 of the power shaft 58 either of two power take-off adaptor shafts or extensions or equivalent attachments. One of these is designated in its entirety by the numeral 76 and is a relatively short shaft flanged at 78 and apertured to cooperate with the pins and cap screws to constitute a coaxial extension of the power shaft 58 to operate as a 1,000 r.p.m. power take-off shaft. As shown in Fig. 1, this shaft extension is splined with the 21-tooth spline. The alternate power take-off shaft is designated by the numeral 80, and, like the shaft 76, is flanged at 82 and this flange is apertured for cooperation with the pins 72 and cap screws 74 to constitute the shaft extension or attachment 80 as the 540 r.p.m. power take-off coaxial extension of the power shaft 58 in lieu of the 1,000 r.p.m. shaft extension 76. As best shown in Fig. 2, the 540 r.p.m. shaft extension 80 has six straight-sided splines. At this point, it should be noted that specific reference to the six splines for the shaft 80 and the twenty-one splines for the shaft 76 are not limitations on the variations that could be resorted to but are illustrated merely because they are based on the power take-off standards discussed above. As shown in Fig. 1, the rear portion of the tractor is equipped with a suitable power take-off shield 84, a portion of which is broken away to expose the 1,000 r.p.m. power take-off shaft 76. Shields of this character are widely known in the art and the details thereof form no part of the present invention, being illustrated as part of the basic environment.

The 1,000 r.p.m. shaft 76 has a flat front radial face 86 which is coaxially bored at 88, for purposes to presently appear. When assembled, the face 86 abuts the power shaft rear face 70. The 540 r.p.m. shaft 80 has a flat front radial face 90 which, unlike the 1,000 r.p.m. shaft 76, is undrilled or perfectly flat, so that the intermediate portion thereof constitutes an abutment, for purposes to presently appear.

The rear part of the tractor carries a drawbar support 92 and a typical rearwardly extending drawbar 94, the relationship of which to either of the power take-off shafts 76 or 80 is determined according to the standards discussed above. However, other than the general relationship, the details are not impotrant.

The power shaft 58 journals coaxially thereon adjacent to its forward end portion a pair of gears 96 and 98. The gear 96 is in constant mesh with the relatively larger gear 38 of the gear cluster 38—40 and therefore is driven at a higher speed than the gear 98 which is in constant mesh with the smaller gear 40 of the gear cluster. Although the portion of the power shaft 58 on which the gears 96 and 98 are journaled is splined, the spline is for the purpose of carrying a pair of shiftable clutch elements or members 100 and 102, and the gears 96 and 98 are nevertheless independently rotatable on the power shaft. The forward clutch 100 of the two clutches is selectively engageable with and disengageable from the gear 96 and therefore serves to connect and disconnect the gear relative to the power shaft 58. When the driving engagement is established between the gear 96 and the clutch 100, the power shaft 58 rotates at a relatively high speed, here producing the 1,000 r.p.m. drive when the power take-off shaft 76 is used. When the clutch 100 is disengaged and the clutch 102 is engaged with the gear 98, the power shaft 58 rotates at 540 r.p.m. for driving the power take-off shaft 80. The 540 r.p.m. condition is shown in Figs. 2 and 3 and the 1,000 r.p.m. condition is shown in Figs. 1 and 4, the difference in lengths between the two power take-off shafts 76 and 80 being due to the difference in standards as between the 540 r.p.m. shaft and the 1,000 r.p.m. shaft.

The mechanism by which the clutches 100 and 102 are shifted is such that when one is engaged the other is disengaged. In addition, the matter of which clutch is engaged is made to depend upon which power take-off shaft 76 or 80 is used. In other words, when the 540 r.p.m. shaft 80 is used, the arrangement guarantees that the power shaft 58 will be driven at the 540 r.p.m. speed. Similarly, when the 1,000 r.p.m. power take-off shaft 76 is used, the shaft 58 will be driven at 1,000 r.p.m., and there is no danger of inadvertently using one speed in the wrong situation. The automatic change between high and low speeds is made to depend upon actuating means responsive to whichever of the two attachment shafts is used.

The power shaft 58 has fore-and-aft passage means in the form of an axial bore 104 which opens at its rear end at the rear radial face 70 of the rear end 56 of the shaft and which terminates at its forward end in a blind end or bottom 106. In addition, the forward portion of the shaft 58 has front and rear radial slot means 108 and 110 respectively. The front or 1,000 r.p.m. clutch 100 has a portion or part, here in the form of a diametrical pin 112, traversing the front slot 108 and therefore intersecting the bore 104. A similar pin 114 establishes a like portion for the rear or 540 r.p.m. clutch 102. The pins 112 and 114 thus constitute means traversing the bore 104 and enabling shifting of the clutches 100 and 102 respectively into and out of engagement with their associated gears 96 and 98. The clutches are of the typical dental type, and the hubs of the gears 96 and 98 respectively have associated toothed or dental clutch elements 116 and 118. Front and rear snap rings 120 and 122 are illustrated as means for retaining the axial location of the gears 96 and 98.

The actuating means includes, in addition to the pins 112 and 114, a rod or shifting element 124 which is axially slidably carried in the bore 104 of the power shaft 58. The terminal rear end of the rod 124 is reduced at 126 to afford a shoulder 128 which cooperates with a retainer 130 at the rear end of the shaft 58 so that the rod 124, once assembled, cannot be accidentally displaced rearwardly beyond the extent permitted by the retainer. The forward end of the rod, as at 132, abuts the pin 114 of the rear or 540 r.p.m. clutch 102. A spacer or tubular member 134 occupies a portion of the bore 104 ahead of the clutch member 102, and has its rear end engaging the clutch member pin 114 and its front end serving as a seat for a coiled compression spring 136, the front end of which abuts the head 138 of a plunger having a shank or stem 140 surrounded by the spring 136 and extending slidably through the tubular spacer 134. The spacer has a fore-and-aft slot 142 which loosely receives a diametrical pin 144 in the stem of the plunger to establish a limit on relative axial movement between the plunger and spacer in a separating direction. The head 138 of the plunger abuts the rear side of the front clutch pin 112 and the opposite side of the pin is engaged by the rear end of a front compression spring 146 which has its front end seating in the blind front end 106 of the shaft bore 104. The spring 136 is of somewhat greater strength than the spring 146, for purposes to be pointed out below.

When the power shaft 58 is equipped with the 540 r.p.m. power take-off shaft attachment or adaptor 80, the flat front radial face 90 of the adaptor abuts the rear end 126 of the rod 124 and thus forces the rod forwardly. The front end 132 of the rod engages the pin 114 of the 540 r.p.m. clutch 102 and shifts this clutch forwardly into engagement with its complementary clutch hub 118 on the 540 r.p.m. gear 98. At the same time, the pin 114 forces the tubular spacer 134 forwardly, compressing the relatively strong spring 136 which acts against the head 138 of the plunger to exert a forward shifting force on the front clutch pin 112 so that the front clutch becomes disengaged from its complementary hub or clutch portion 116 on the 1,000 r.p.m. gear 96, the front spring 146 yielding of course to the forward pressure. As previously stated, the spring 136 is stronger than the spring 146 and when the former is compressed by the spacer 134 as the rear clutch member 102 is shifted forwardly, the front spring is easily overcome. Moreover, the rear end of the stem 140 of the plunger is closely proximate to the front side of the rear clutch pin 114 and the front clutch cannot inadvertently shift rearwardly into engagement with the hub 116 of the gear 96 as long as the power take-off shaft adaptor 80 is in place.

The dual-function lost-motion connection established by the spacer 134, plunger 138—140 and the spring 136 not only assures disengagement of the front clutch 100 prior to engagement of the rear clutch 102 but also facilitates engagement of the clutch components 102 and 118, because, if the front clutch 100 did not disengage first, it would be difficult to achieve engagement of the rear clutch 102, which will be recognized when it is considered that if the two gears 96 and 98 are both in constant mesh with the gear cluster 38—40, the two gears could not move relative to each other and if one of the gears is locked to the power shaft 58, the shaft could not be rocked angularly to bring about alinement of the teeth of the clutch components 102 and 118. However, since the clutch 100 disengages first, meshing of the teeth at 102 and 118 is a relatively easy matter, especially since the adaptor 80, even before being secured in place by the cap screws 74 can effect a connection with the power shaft 58 via the locating pins 72. Once the clutch 102 is shifted forwardly, the front face 90 of the adaptor will lie against the rear face 70 of the power shaft and the cap screws 74 may be installed and tightened.

When the adaptor 80 is removed, it obviously removes the forward force on the shifter rod 104 and this rod is automatically shifted rearwardly under action of the expansion of the two springs 136 and 146. Again, the situation is such that the rear clutch 102 is positively disengaged before the front clutch is engaged and even though the front clutch fails to immediately engage, which may occur because of misalinement between the toothed components 100 and 116. This result is brought about because as soon as the forward force is removed from the shifter rod 104, the spring 136 expands and acts through the spacer 134 to shift the rear clutch 102 rearwardly, since the rear end of the spacer is in constant abutting contact with the pin 114 of the rear clutch. In other words, since the head 138 of the plunger engages the pin 112 of the front clutch, the spring 136 acts between the two clutches in a separating direction. At the same time, the spring 146 is constantly urging the front clutch rearwardly. Hence, even should the front clutch "hang up" or fail to engage immediately, the rear spring 136 will assure complete disengagement of the rear clutch 102. Thereafter, as the shaft 58 is rocked angularly, the teeth at 100 and 116 will line up and engagement of the front clutch will be effected. The spring 146 is strong enough to maintain normal engagement of the clutch 100 when the power take-off shaft adaptor 80 is removed.

The invention in its broader aspects includes other methods of shifting the two clutches 100 and 102, because the automatic change described, particularly in conjunction with the remote control of the rod 104 by a selection of adaptor extensions, such as those at 76 and 80, is believed to be broadly novel. The specific details of the actuating means, to the extent that it includes the spacer 134, springs 136 and 146 and plunger 138—140 is specifically novel in that it admirably adapts itself to the space limitations imposed by the particular transmission and drive mechanism dealt with and disclosed here.

When the clutches 100 and 102 are shifted rearwardly, the 1,000 r.p.m. condition is established and it is in this connection that the recess or bore 88 in the front end of the 1,000 r.p.m. power take-off shaft 76 becomes important, since this recess accommodates the rear end 126 of the rod 104 and allows the rod to be extended rearwardly (Fig. 4). In other words, any time the 1,000 r.p.m. shaft 76 is used, the 1,000 r.p.m. driving condition for the power shaft 58 will obtain. When the 540 r.p.m. shaft 80 is used, the mere installation thereof automatically brings about the 540 drive condition in the power take-off transmission or drive train because the flat front face 90 of the adaptor 80 forces the rod 104 forwardly.

As indicated, the invention may be exploited in other driving conditions but is particularly significant in the power take-off field, for reasons already outlined. Other features of the invention, in addition to those enumerated, will readily occur to those versed in the art, as will variations in the design and structure of the preferred embodiment developed here, all without departure from the spirit and scope of the invention.

What is claimed is:

1. Speed-change means for power take-off mechanisms and the like, having drive means, comprising: a fore-and-aft shaft having a rear opening, an axial bore communicating with and extending forwardly from said opening and forward axially elongated radial slot means intersecting the bore; dual-speed means for selectively driving the shaft at either of two speeds from the drive means and including a rear clutch member coaxially rotatable with the shaft and axially shiftable forwardly from a disengaged position to an engaged position and having a portion entering said slot means, and a front clutch member coaxially rotatable with the shaft and mounted on the shaft independently of the rear clutch so as to be axially shiftable rearwardly from a disengaged position to an engaged position and having a portion entering said slot means in axially spaced relation to the rear clutch member portion; a shifting element axially slidable in the bore and having a rear portion exposed at said rear opening of the shaft and a front end engaging the rear clutch member portion so that forward shifting of said element in response to forward force applied thereto incurs forward shifting of the rear clutch member; interconnecting means in the bore between the clutch member portions and including a spring-loaded lost-motion device enabling limited forward shifting of the rear clutch relative to the front clutch and operative to shift the front clutch member forwardly upon forward shifting of the rear clutch member; and biasing means in the bore ahead of and acting on the front clutch member portion to be loaded upon forward shifting of said clutch members and operative to act on the front clutch member and via said interconnecting means on the rear clutch member to shift both clutch members and said element rearwardly when forward force on said element is removed.

2. The invention defined in claim 1, in which: the shaft has a rear radial face and said bore opens at its rear end at said face to afford said opening.

3. The invention defined in claim 2, including: shaft extension means coaxially and removably connectible to the shaft at said face and including an abutment engageable with the exposed rear end of the element to apply the forward force thereto.

4. The invention defined in claim 1, in which: the range of movement of the clutch members between their respective engaged and disengaged positions is such that each member is moved to its disengaged position prior to movement of the other member to its engaged position.

5. The invention defined in claim 1, in which: the interconnecting means includes a plunger axially movable in the bore and having front and rear ends respectively abutting the front and rear member portions; a spacer in the bore and axially slidable relative to the plunger and shaft and having a rear end contacting the rear clutch member portion and a front end spaced rearwardly from the front clutch member portion; and a coil spring surrounding the plunger and compressible between and expansive against the front end of the spacer and the front clutch member portion to constantly urge the rear clutch member rearwardly so that when the forward force is removed from the element said last-named spring forces the rear clutch member rearwardly even though the front clutch member fails to move completely rearwardly to its engaged position.

6. The invention defined in claim 1, in which: the interconnecting means includes a plunger axially movable in the bore and having front and rear ends respectively abutting the front and rear member portions; and means including a coil spring surrounding the plunger and compressible between and expansive against the front and rear clutch member portions to constantly urge the rear clutch member rearwardly so that when the forward force is removed from the element said last-named spring forces the rear clutch member rearwardly even though the front clutch member fails to move completely rearwardly to its engaged position.

7. Power take-off mechanism for a vehicle or the like having a drive shaft, comprising: a power shaft extending away from the drive shaft to a remote end portion; a two-speed drive train between the shafts, including first and second, separate and independently mounted coupling means, and optionally operative in a first-speed condition, with the first coupling means disengaged and the second coupling means engaged, or in a second-speed condition, with the first coupling means engaged and the second coupling means disengaged; first biasing means acting to yieldably retain engagement of the second coupling means; an operating member accessible at the remote end portion of the power shaft and shiftable between first and second positions respectively incurring the first- and second-speed conditions of the drive train, said member being engageable with and for shifting the first coupling means toward engagement thereof upon shifting of said member to its second position; second biasing means acting on the second coupling means in opposition to the first biasing means; and force-transmitting means operative upon shifting of the first coupling means toward engagement, via said member, to load the second biasing means so as to bias the member for return to its first position, said force-transmitting means further including a lost-motion device operative, upon shifting of the first coupling means toward but short of engagement, to positively disengage the second coupling means and thereby to load the first biasing means.

8. The invention defined in claim 7, in which: the power shaft has an axial bore therein and a pair of radial slots spaced axially on the order of the two coupling means; said coupling means are coaxially carried on the shaft, said first coupling means including a part entering one slot and the second coupling means including a part entering the other slot; the first biasing means is housed in the shaft bore and engages the second coupling means part from the side of said part remote from the remote end of the power shaft; the operating member is housed in the bore and engages the first coupling means part from the side thereof toward said remote end; the force-transmitting means includes a bore-carried sleeve and a sleeve-carried plunger between the two coupling parts and constituting the lost-motion device; and the second biasing means is received in the bore axially between the sleeve and plunger.

9. Power take-off mechanism for a vehicle or the like having a drive shaft, comprising: a power shaft extending away from the drive shaft to a remote end portion; a two-speed drive train between the shafts, including first coupling means having a pair of cooperative toothed coupling parts and second coupling means having a pair of cooperative toothed coupling parts, one part of each coupling means being shiftable into and out of engagement with the associated other part and said shiftable parts being independently mounted for shifting relative to each other as well as relative to said other parts, said drive train being optionally operative in a first-speed condition, with the first coupling parts disengaged and the second coupling parts engaged, or in a second-speed condition, with the first coupling parts engaged and the second coupling parts disengaged; and actuating means accessible at said remote end of the power shaft and connected to the two shiftable coupling parts and biased in one direction to incur said disengagement and engagement of the respective coupling means in said first-speed condition and shiftable in the opposite direction to incur said engagement and disengagement of the respective coupling means in said second-speed condition, said actuating means including a spring-loaded lost-motion device operative, when the actuating means is shifted to incur said first-speed condition, to immediately shift and disengage the first shiftable coupling part and to condition the second shiftable coupling part for subsequent shifting and engagement upon meshing of the teeth thereof with the teeth of its associated coupling part.

10. In a tractor including a body containing drive means including a transmission driving shaft and having a rear upright wall: power take-off mechanism comprising: a hollow fore-and-aft power shaft having a front end proximate to the drive means and a rear end exposed at said rear wall; a two-speed drive train between the transmission driving shaft and the power shaft and including shiftable means for selectively conditioning the drive train to produce either first or second speed in the power shaft irrespective of the speed of the transmission driving shaft; an axially shiftable operating member extending axially through the power shaft and connected at its forward end to the shiftable means and having a rear end accessible at said rear end of the power shaft; means biasing the member axially in one direction to cause the shiftable means to incur the first speed in the power shaft; and an external power take-off shaft extension detachably connectible coaxially to the rear end of the power shaft and engaging the operating member for shifting same against the biasing means to cause the shiftable means to produce the second speed in said power shaft.

11. In a tractor including a body containing drive means including a transmission driving shaft and having a rear upright wall: power take-off mechanism comprising: a fore-and-aft power shaft having a front end proximate to the drive means and a rear end exposed at said rear wall; a two-speed drive train between the drive means and the power shaft and including shiftable means for selectively conditioning the drive train to produce either first or second speed in the power shaft irrespective of the speed of the transmission driving shaft; an operating member connected at its forward end to the shiftable means and having a rear end accessible at said rear wall of the tractor; means biasing the member in one direction to cause the shiftable means to incur the first speed in the power shaft; and an external power take-off shaft extension detachably connectible coaxially to the rear end of the power shaft and engaging the operating member for shifting same against the biasing means to cause the shiftable means to produce the second speed in said power shaft.

12. In a tractor including a body containing drive means including a transmission driving shaft and having a rear upright wall: power take-off mechanism comprising: a fore-and-aft power shaft having a front end proximate to the drive means and a rear end exposed at said rear wall; a two-speed drive train between the drive means and the power shaft and including shiftable means for selectively conditioning the drive train to produce either first or second speed in the power shaft irrespective of the speed of the transmission driving shaft; an operating member connected at its forward end to the shiftable means and having a rear end accessible at said rear wall of the tractor; means biasing the member in one direction to cause the shiftable means to incur the first speed in the power shaft; and said operating member being shiftable against the biasing means to cause the shiftable means to produce the second speed in said power shaft.

References Cited in the file of this patent

UNITED STATES PATENTS

| | | |
|---|---|---|
| 455,344 | Libby | July 7, 1891 |
| 2,521,729 | Keese | Sept. 12, 1950 |
| 2,534,951 | Cargill | Dec. 19, 1950 |
| 2,602,898 | Inghram et al. | July 8, 1952 |